United States Patent Office 2,732,400
Patented Jan. 24, 1956

2,732,400

METHOD OF PREPARING METHIONINE

Martin J. Weiss, Highland Park, N. J., assignor to American Cyanamid Company, New York, N. Y., a corporation of Maine No Drawing. Application May 25, 1953,
Serial No. 357,353

8 Claims. (Cl. 260—534)

This invention relates to an improved process for the preparation of methionine.

In the past, a number of processes have been described for the preparation of methionine, an essential amino acid. For instance, Barger and Coyne (Biochem. J. 22 1420–21 (1928)) described the reaction of beta-methylmercaptopropionaldehyde with ammonium chloride and sodium cyanide to produce the corresponding nitrile which was hydrolyzed with hydrochloric acid. They obtained an overall yield of about 6% of methionine. Catch et al. (J. C. S. 1610 (1947)) described the reaction of the same aldehyde with liquid hydrocyanic acid and subsequently with alcoholic ammonia to produce the corresponding aminonitrile. The nitrile was hydrolyzed to methionine with hydrochloric acid. The undesirable features of this method are the use of highly poisonous liquid hydrocyanic acid and the comparatively low yields. Gresham and Schweitzer (U. S. Patent 2,485,236) disclosed the reaction of beta-methylmercaptopropionaldehyde with liquid hydrocyanic acid and subsequently with liquid ammonia under pressure to produce the nitrile which was then hydrolyzed in aqueous sulfuric acid to methionine. This method is disadvantageous in the use of liquid hydrocyanic acid and necessity of carrying out the amination under pressure. Pierson et al. (J. A. C. S. 70, 1450 (1948)) utilized the sodium bisulfite addition product of beta-methylmercaptopropionaldehyde which was reacted with sodium cyanide to produce the cyanohydrin. This intermediate was then converted to methionine by way of the aminonitrile or the hydantoin. This method, however, produced methionine in comparatively low yields. The previously described methods of preparing methionine described above all have undesirable features which range from the use of dangerous intermediates or difficult procedures to poor overall results.

I have now found that methionine can be prepared in good yields by a relatively simple procedure utilizing ordinary equipment. Methionine is prepared by the process of the present invention by reacting beta-methylmercaptopropionaldehyde with an alkali metal cyanide and an ammonium salt in an aqueous-alcoholic solvent medium in the presence of an excess of ammonia. The alpha-amino-gamma-methylmercaptobutyronitrile is then hydrolyzed with an aqueous-alcoholic solution of an alkali metal hydroxide to methionine.

An object of the present invention is to produce methionine by a commercial process which will give good yields. Another object is to produce methionine by a continuous process without the use of highly specialized and expensive equipment. A still further object is to produce methionine without resorting to the use of undesirable highly poisonous intermediates.

In carrying out the process of the present invention I have found that the use of an essentially homogeneous aqueous-alcoholic solvent allows a greater degree of intimate contact between the reactants than the use of immiscible solvents as used by Barger and Coyne, and thus produces higher yields of the desired product. The alcohols found useful are those miscible with water such as methanol, ethanol, propanol and the like. Also found desirable is an excess of ammonia.

The process of the present invention can be carried out using practically any inorganic cyanide, however, we prefer to use the alkali metal cyanides since they are readily available. In general, ammonium salts of acids can be used such as ammonium chloride, ammonium bromide, ammonium sulfate, ammonium phosphate, ammonium acetate, and the like. For best results it is necessary to use an excess of ammonia which may vary from three to fifteen times the theoretical amount, however, about a seven-fold excess gives optimum results.

When carrying out the present process it is desirable to keep the temperature low for the initial reaction usually between −20° and 50° C. Best results are obtained at a temperature of −5° to 15° C. The initial reaction having been completed, the alpha-amino-gamma-methylmercaptobutyronitrile may be isolated by partial evaporation of the solvents and extraction with a water immiscible low-boiling solvent, such as benzene, methylene chloride and the like.

In the final step of hydrolysis of the alpha-amino-gamma-methylmercaptobutyronitrile to methionine, it has been found that good results can be obtained by treating the nitrile in an aqueous-alcoholic solution with an alkali metal hydroxide. Other alkaline agents can be used such as a quaternary ammonium hydroxide, for example, trimethyl benzyl ammonium hydrochloride. The reaction proceeds satisfactorily at ordinary room temperatures but can be speeded up by heating, if desired. The temperature can be from 10° C. to 100° C. At this temperature the reaction time may be from several minutes to 48 hours. Following completion of the reaction, the reaction mixture is acidified and chilled whereupon the methionine separates as a precipitate. The product can be further purified by simply washing or reslurrying with aqueous alcohol or by recrystallization.

The crude washed or reslurried product produced in the process of the present invention is almost white in color and of excellent quality, suitable for medicinal use. This is in sharp contrast to statements in the prior art regarding the product produced by other processes hereinbefore described, and to our own experience with these processes.

The following examples illustrate in detail the preparation of methionine from beta-methylmercaptopropionaldehyde. The examples are by way of illustration and are not intended to be a limitation of the invention.

*Example 1*

Beta-methylmercaptopropionaldehyde (.60 M) (56.5 g.) is added to a stirred solution of sodium cyanide (.66 M—32.4 g.) and ammonium chloride (0.63 M—33.7 g.) in water (140 ml.). The temperature of the mixture rises to 49° C. and is maintained at this point by heat evolution for about 5 minutes when it slowly begins to fall. Methanol (50 ml.) is added and the mixture is stirred during 4 hours as the temperature falls to 28° C. (room temperature). After chilling to +12° C., additional methanol (35 ml.) and a concentrated aqueous ammonium hydroxide solution (1.4 M—100 ml.) are added and stirring is continued for two hours at a temperature maintained at from +5° to +15° C. The organic layer is separated and solvent is stripped from the aqueous layer at water aspirator pressure at a temperature below 40° C. The residue is extracted several times with chloroform and the chloroform extracts are combined with the separated oil. Chloroform is removed at water aspirator pressure at a temperature below 35° C. to leave crude alpha-amino-gamma-methylmercaptobutyronitrile (methionine nitrile) in 88% yield (68 g.) as a clear, somewhat viscous oil.

The methionine nitrile (20 g.) is dissolved in a solution prepared from 50 ml. of aqueous 5 N sodium hydroxide solution and 65 ml. of ethanol. The solution is then refluxed for twenty-four hours; ammonia is evolved. The solution is treated with activated carbon, filtered, acidified with glacial acetic acid (17 ml.), chilled to −10° and filtered to give crude product. This crude product is then slurried with a solution made up of 20 ml. of water and 20 ml. of methanol, filtered at −5° to +10° C. and dried to give d,l-methionine as white platelets.

*Example 2*

Sodium cyanide (32 g.) and ammonium chloride (37.7 g.) are dissolved in a solution made up of methanol (150 ml.) and concentrated aqueous ammonia (300 ml.). The solution is stirred, chilled (ice bath) to +5° C. and beta-methylmercaptopropionaldehyde (56.5 g.) is added dropwise, during one hour, at a temperature maintained at from +5° to +10° C. Stirring is continued at +5° C. for 6 hours and then at room temperature for 15 hours. Most of the solvent is stripped at water aspirator pressure (internal temperature does not rise above 35° C.) to give an oil plus an aqueous layer of about 75–100 ml. It is extracted with three portions of ether and then the ether is removed at water aspirator pressure to leave alpha-amino-gamma-methylmercaptobutyronitrile as a light colored oil in 94% yield (66 g.).

The methionine nitrile (18 g.) is dissolved in a solution consisting of 42 ml. of aqueous 5 N sodium hydroxide solution and 60 ml. of ethanol. The solution is allowed to stand at room temperature for twenty-four hours. It is then treated as in Example 1 to give 13.3 g. (63%) overall from beta-methylmercaptopropionaldehyde of d,l-methionine as white platelets.

*Example 3*

To a solution of 7.2 g. potassium cyanide and 6.5 g. ammonium chloride in 40 ml. water is added 9.4 ml. beta-methylmercaptopropionaldehyde followed by 25 ml. methanol. This gives a cloudy solution, which clears up on warming to 45°–50° C. Heating at 45°–50° C. is continued for 3.25 hours, then 15 ml. concentrated ammonium hydroxide and 10 ml. methanol are added and heating continued at 45°–50° C. for 2.75 hours longer. After cooling, the organic solvent is removed under vacuum and the residual oil is extracted with chloroform. The chloroform is evaporated under reduced pressure to leave about 10 ml. of residual oil. It is dissolved in ethanol and treated with a slight excess of oxalic acid in ethanol and the precipitate of the aminonitrile oxalate is filtered and air dried.

*Example 4*

When the hydrolysis described in Example 2 was carried out by refluxing for two hours a hydrolysis solution containing potassium hydroxide instead of sodium hydroxide, methionine was obtained in 51% yield.

*Example 5*

Methionine nitrile (18 g.) is dissolved in a solution made up of 30 ml. of aqueous 5 N sodium hydroxide solution, 12 ml. of water and 60 ml. of ethanol. The solution is refluxed for one hour and fifty-five minutes. The solution treated with activated carbon, filtered, acidified with excess glacial acetic acid, chilled to −15° C. and filtered gives good quality d,l-methionine as glistening white platelets.

*Example 6*

Methionine nitrile is prepared as in Example 2 and aliquot portions were treated in the following manner:

| Experiment | Conditions (all under reflux) | Time (hours) | Color | Yield (percent) |
|---|---|---|---|---|
| 116 | Sodium hydroxide (1.5-equiv.) in 40% $H_2O$—$C_2H_5OH$. | 5 | white | 47 |
| 117 | Sodium hydroxide (1.5-equiv.) in 20% $H_2O$—$C_2H_5OH$, diluted to 40% $H_2O$ before precipitation of methionine. | 2 | ...do..... | 44 |
| 118 | Sodium hydroxide (1.07-equiv.) in 40% $H_2O$—$C_2H_5OH$. | 2 | ...do..... | 44 |
| 121 | Sodium hydroxide (1.5-equiv.) in 40% $H_2O$—$C_2H_5OH$. | 15 | ...do..... | 51 |

*Example 7*

Methionine nitrile is hydrolyzed under the following conditions to give methionine:

| Experiment | Condition (all under reflux) in 40% $H_2O$—$C_2H_5OH$ | Time (Hours) | Color | Yield (percent) |
|---|---|---|---|---|
| 128 | Potassium hydroxide (1.5-equiv.). | 2 | white | 51 |
| 127 | Sodium hydroxide (1.5 equiv.). | 2 | ...do..... | 53 |
| 125 | ....do.... | 3 | ...do..... | 51 |
| 126 | ....do.... | 7 | ...do..... | 53 |
| 129 | Sodium hydroxide (1.5-equiv.) at room temperature. | 24 | ...do..... | 63 |

*Example 8*

The following shows the results obtained by hydrolyzing methionine nitrile at room temperature for varying lengths of time (in 40% water-ethanol with 1.5 equivalents of sodium hydroxide):

| Experiment | Time (hours) | Yield (percent) | Color |
|---|---|---|---|
| 1 | 4 | 15 | white. |
| 2 | 8 | 42 | Do. |
| 3 | 16 | 56 | Do. |
| 4 | 24 | 52 | Do. |
| 5 | 40 | 56 | Do. |
| 6 | 48 | 56 | Do. |
| 7 | at reflux one hour | 56 | Do. |

*Example 9*

Beta-methylmercaptopropionaldehyde (35 g.) is added dropwise during one hour to a stirred solution made up of sodium cyanide (22.4 g.) and ammonium chloride (21.8 g.) in concentrated aqueous ammonia (195 ml.) and methanol (100 ml.). During the addition and subsequently for ninety minutes the temperature is maintained at +5° C. by an ice bath. Stirring is discontinued and the reaction flask is placed in a fresh ice bath and allowed to sit overnight as the bath warms to room temperature. After sixteen hours, a solution prepared from sodium hydroxide (37 g.) and water (50 ml.) is added. Additional methanol (35 ml.) is added and the solution is refluxed for ninety minutes. It is then cooled, acidified with acetic acid and chilled in an ice bath. The crude methionine is filtered, washed with methanol and slurred with 100 ml. of 50% water-methanol. The slurry is heated to the boiling point and then chilled (ice bath), filtered and dried to give good quality methionine as a white product in 48% yield.

This continuous process illustrates a further advantage of the alkaline hydrolysis procedure. A similar process with acid would require the prior neutralization of the very considerable amounts of excess ammonia to give relatively large quantities of ammonium salt which will complicate the isolation of good quality methionine.

I claim:
1. A method of preparing methionine which comprises reacting beta-methylmercaptopropionaldehyde with an alkali metal cyanide and an ammonium salt in an aqueous lower aliphatic alcoholic solvent at a temperature below 50° C. in the presence of an excess of ammonia to produce alpha-amino-gamma-methylmercaptobutyronitrile, treating said nitrile under alkaline conditions and recovering methionine therefrom.

2. A method of preparing methionine which comprises reacting beta-methylmercaptopropionaldehyde with sodium cyanide and ammonium chloride in an aqueous lower aliphatic alcoholic solvent at a temperature below 50° C. in the presence of an excess of ammonia to produce alpha-amino-gamma-methylmercaptobutyronitrile, treating said nitrile with an aqueous alcoholic alkali metal hydroxide solution and recovering methionine therefrom.

3. A method of preparing methionine which comprises reacting beta-methylmercaptopropionaldehyde with potassium cyanide and ammonium chloride in an aqueous lower aliphatic alcoholic solvent at a temperature below 50° C. in the presence of an excess of ammonia to produce alpha-amino-gamma-methylmercaptobutyronitrile, treating said nitrile with an aqueous alcoholic alkali metal hydroxide solution and recovering methionine therefrom.

4. A method of preparing methionine which comprises reacting beta-methylmercaptopropionaldehyde with an alkali metal cyanide and ammonium chloride in an aqueous alcoholic solvent at a temperature within the range of −20° to 50° C. in the presence of an excess of ammonia to produce alpha-amino-gamma-methylmercaptobutyronitrile, treating said nitrile with an aqueous alcoholic alkali metal hydroxide solution and recovering methionine therefrom.

5. A method of preparing methionine which comprises reacting beta-methylmercaptopropionaldehyde with sodium cyanide and ammonium chloride in an aqueous alcoholic solvent at a temperature within the range of −20° to +50° C. in the presence of an excess of ammonia to produce alpha-amino-gamma-methylmercaptobutyronitrile, treating said nitrile with an aqueous alcoholic alkali metal hydroxide solution and recovering methionine therefrom.

6. In a method of preparing methionine from beta-methylmercaptopropionaldehyde in an aqueous solution in the presence of sodium cyanide and ammonium chloride the steps which comprise having present an aqueous lower aliphatic alcoholic solvent and an excess of ammonia.

7. In a method of preparing methionine from beta-methylmercaptopropionaldehyde in an aqueous solution in the presence of sodium cyanide and ammonium chloride the step which comprises having present a water miscible lower aliphatic alcoholic solvent and an excess of ammonia and treating the resulting methionine nitrile with an alkali metal hydroxide solution.

8. In a method of preparing methionine from beta-methylmercaptopropionaldehyde the step which comprises treating methionine nitrile with an aqueous alcoholic alkali metal hydroxide solution and recovering methionine therefrom.

References Cited in the file of this patent

UNITED STATES PATENTS

| | | |
|---|---|---|
| 2,004,523 | Fick | June 11, 1935 |
| 2,480,644 | Goldsmith et al. | Aug. 30, 1949 |

FOREIGN PATENTS

| | | |
|---|---|---|
| 656,349 | Germany | Feb. 7, 1938 |

OTHER REFERENCES

Kendall et al.: Org. Syn., Coll. vol. I (1941), p. 21.
Greenberg: "Amino Acids and Proteins," 1951, publ. by Chas. C. Thomas, Springfield, Ill., pps. 116–117, 137.